(12) United States Patent
Lappin et al.

(10) Patent No.: US 8,190,531 B2
(45) Date of Patent: *May 29, 2012

(54) METHOD TO FACILITATE ENGAGEMENT AND COMMUNICATION BETWEEN A COMPANY AND A RECRUITER INCLUDING A BOUNTY

(75) Inventors: Jeremy Lappin, New York, NY (US); Mark Hohmann, San Francisco, CA (US)

(73) Assignee: BountyJobs, Inc., New York, NY (US)

( * ) Notice: Subject to any disclaimer, the term of this patent is extended or adjusted under 35 U.S.C. 154(b) by 931 days.

This patent is subject to a terminal disclaimer.

(21) Appl. No.: 12/208,283

(22) Filed: Sep. 10, 2008

(65) Prior Publication Data

US 2009/0125379 A1    May 14, 2009

Related U.S. Application Data

(63) Continuation-in-part of application No. PCT/US2006/044168, filed on Nov. 13, 2006.

(60) Provisional application No. 60/747,373, filed on May 16, 2006, provisional application No. 60/806,603, filed on Jul. 5, 2006, provisional application No. 60/806,606, filed on Jul. 5, 2006, provisional application No. 60/971,102, filed on Sep. 10, 2007, provisional application No. 60/971,106, filed on Sep. 10, 2007, provisional application No. 60/971,109, filed on Sep. 10, 2007, provisional application No. 60/971,112, filed on Sep. 10, 2007, provisional application No. 60/971,126, filed on Sep. 10, 2007, provisional application No. 60/971,128, filed on Sep. 10, 2007, provisional application No. 60/971,131, filed on Sep. 10, 2007, provisional application No. 60/977,563, filed on Oct. 4, 2007.

(51) Int. Cl.
*G06Q 50/00* (2012.01)
*G06Q 10/00* (2012.01)
(52) U.S. Cl. .......................................... 705/310; 705/1.1
(58) Field of Classification Search ........................ None
See application file for complete search history.

(56) References Cited

U.S. PATENT DOCUMENTS

| | | | |
|---|---|---|---|
| 6,161,139 A | 12/2000 | Win et al. |
| 6,457,005 B1 | 9/2002 | Torrey |
| 2002/0133369 A1 | 9/2002 | Johnson |
| 2003/0163402 A1 | 8/2003 | Kincart |

(Continued)

FOREIGN PATENT DOCUMENTS

WO    WO 2007/136407    11/2007

(Continued)

OTHER PUBLICATIONS

U.S. Appl. No. 12/526,007, filed Aug. 5, 2009, Lappin, Jeremy.

(Continued)

*Primary Examiner* — Jonathan Ouellette
(74) *Attorney, Agent, or Firm* — Jeffrey Schox

(57) ABSTRACT

The present invention includes a method to facilitate engagement and communication between a company with an available position and a recruiter. The method includes the steps of posting information about the available position for the company, and receiving information about a candidate for the available position of the company from the recruiter, and submitting the information about the candidate for the available position of the company to the company. The method further includes the step of receiving payment from the company and transmitting a portion of the payment to the recruiter upon the selection by the company of a candidate for the available position.

31 Claims, 8 Drawing Sheets

U.S. PATENT DOCUMENTS

| | | |
|---|---|---|
| 2004/0215793 A1 | 10/2004 | Ryan et al. |
| 2005/0010467 A1 | 1/2005 | Dietz et al. |
| 2005/0027639 A1 | 2/2005 | Wong |
| 2005/0261956 A1 | 11/2005 | Kato |
| 2005/0278205 A1 | 12/2005 | Kato |
| 2006/0085480 A1 | 4/2006 | Veronesi et al. |
| 2006/0229899 A1 | 10/2006 | Hyder et al. |
| 2008/0301045 A1 | 12/2008 | Lappin et al. |
| 2009/0125379 A1 | 5/2009 | Lappin et al. |
| 2009/0125443 A1 | 5/2009 | Lappin et al. |

FOREIGN PATENT DOCUMENTS

| | | |
|---|---|---|
| WO | WO 2007/136408 | 11/2007 |

OTHER PUBLICATIONS

Report to the National Education Association on the Trentds in Foreign Teacher Recruitment, Barber, Randy, Washington, DC Center for Economic Organizing, Pub. Jun. 2003, retrieved May 9, 2008 http://www.nea.org/teachershortage/images/foreignteacher.pdf.

Dashboard from Job Poster View - Preferred tab bountyjobs.logo   dashboard   my account   my profile   sign out   Welcome, Mark!

| Postings | Closed Postings | Preferred Recruiters | | | | Account Balance: $2,300 |
|---|---|---|---|---|---|---|

| Preferred Recruiter | # Submiss | # Fills | % Filled | # Preferred By Companies | |
|---|---|---|---|---|---|
| Mr. S | 15 | 5 | 33% | 2 | remove |
| Mr. L | 81 | 9 | 11% | 0 | remove |

FIGURE 6

Submissions from Job Poster View

Submissions (2 new)
Active Recruiters (4)

Posting Title

| Not Interested | Candidate | Recruiter | Date Received ↓ | Resume | Recruiter's Notes | Actions |
|---|---|---|---|---|---|---|
| [-] | Ms. S | Recruiters Intl | May 21 | [+] | [+] | Select an action ↓ |
| [-] | Mr. B | Recruiters Intl | May 21 | [+] | [+] | Select an action ↓ |
| [-] | Mr. M | Recruiters Intl | May 21 | [+] | [+] | Select an action ↓ |

FIGURE 7

Dashboard from Recruiter View- Submissions tab bountyjobs.logo    dashboard    my account    my profile    sign out    Welcome, Mark!

Account Balance: $15,500
Pending: $12,300

| Search | Saved Bounties | Active Submissions | Active Candidates | Candidates | Power Rankings |
|---|---|---|---|---|---|

| Candidate | Company | Position | Bounty | Contact | Sent | Opened | Submitted Notes | Status | Request Bounty |
|---|---|---|---|---|---|---|---|---|---|
| Ms. S. | | Sales Associate | 10,000 | Mr. S. | 5/21 9:30 am | 5/21 9:32 am [+] | | x | [$] |
| Mr. L. | | Java Prog... | 6,000 | Mr. L. | 5/20 4:30 pm | 5/21 8:31 a[+] | | f | [$] |
| Ms. P. | | Marketing... | 3,000 | Ms. F. | 5/20 3:21 pm | 5/20 4:30 p[+] | | o | [$] |
| Mr. B. | | Director, Bus | 5,000 | Mr. B. | 5/20 11:42 am | 5/20 4:59 p[+] | | f | [$] |
| Mr. U. | | Oracle Admin | 7,000 | Ms. G. | 5/19 3:57 pm | 5/21 3:23 p[+] | | o | [$] |
| Mr. D. | | Sales Associate | 6,000 | Mr. W. | 5/18 9:08 am | 5/19 2:39 p[+] | | x | [$] |

Prev 1 2 3 4 5 Next

FIGURE 10

Dashboard from Recruiter View- Arch Cand tab bountyjobs.logo    dashboard    my account    my profile    sign out    Welcome, Mark!

Account Balance: $15,500
Pending: $12,300

| Search | Saved Bounties | Active Submissions | Active Candidates | Candidates |
|---|---|---|---|---|

Add New Candidate

| | Candidate | Email | Date Added ▼ | Submissions | Notes | |
|---|---|---|---|---|---|---|
| ☐ | Mr. S. | mrs@email.com | 5/21 | 12 | Unix Programmer | Select an action ▼ |
| ☐ | Mr. L. | mrl@email.com | 5/22 | 23 | Sales Guy | Select an action ▼ |
| ☐ | Ms. F. | msf@email.com | 5/25 | 17 | Marketing Director | Select an action ▼ |

Mouse Rollover causes notes to appear.

Delete Checked    Move Checked to Active

FIGURE 11

Candidate from Recruiter View

Mr. S      Job Title      Edit Candidate
mrs@email.com      Submit Candidate
Delete Candidate Notes only visible by you

Recruiter's Notes
Etc.
Etc.
Etc.
Etc.

Resume [+]

FIGURE 12

Submissions from Recruiter View

Active Submissions...

| Title | Bounty | Contact | Company | Date Sent | Date Viewed | Submitted Notes | Status | Request Bounty Payment |
|---|---|---|---|---|---|---|---|---|
| Sales Assistant | $5,000 | Ms. S | X. Inc. | May 21 | Jun 5 [+] |  |  | [$] |
| Sales Assistant | $5,000 | Ms. S | X. Inc. | May 21 | Jun 5 [+] |  | x | [$] |

FIGURE 13

Profile Page

Contact Information
First Name    Last Name
Email address (o)
Phone Number (o)
Fax Number (o)
Cellphone Number (o)

Company
Name
Address 1 (o)
Address 2 (o)
City (o)
State (o)
Zip (o)

Company Description
Description, etc.

Personal Description
Description, etc.

Statistics

Time/Date of Last Login (For Recruiter)
Number of Preferred Companies
Number of Candidates Placed
Total Submissions
% of Candidates Placed to Submissions
Tenure on Site Possible:
Average Bounty
Total Amount Placed on Site (For Company)
Number of Candidates Placed
Number of Postings
% of Postings resulting in a Candidate Placement
Tenure on Site Possible:
Average Bounty Posted
Average Bounty Successful
Candidates Retracted
Payment Issues    Return to Previous Page FIGURE 14a

Account Page

Account Balance:    $10,000        Add Money to Account

Pending:            $5,000         Withdraw Money from Account

Payment Information

Pay by Credit Card    X

Card Number    ** ** 1234    (edit)

Pay by Invoice    ☐

Transaction History
Bounty Fee collected    May 21    $10,000
Submission Fees         May 22    $35

FIGURE 14b

METHOD TO FACILITATE ENGAGEMENT AND COMMUNICATION BETWEEN A COMPANY AND A RECRUITER INCLUDING A BOUNTY

CROSS-REFERENCE TO RELATED APPLICATIONS

This application is related to U.S. application Ser. No. 12/208,285 filed on 10 Sep. 2008 and entitled "Method to Facilitate Engagement and Communication between a Company and a Recruiter."

This application is a continuation in part of international application number PCT/US2006/044168 filed on 13 Nov. 2006 and entitled "Method to Facilitate Engagement and Communication between a Company and a Recruiter Including a Bounty", the benefit of which claims priority to U.S. Provisional Application No. 60/747,373 filed 16 May 2006 and entitled "System and Method to Facilitate a Marketplace on a Network", the benefit of U.S. Provisional Application No. 60/806,603 filed 5 Jul. 2006 and entitled "Method for Finding Job Candidates with Active Recruiters", and the benefit of U.S. Provisional Application No. 60/806,606 filed 5 Jul. 2006 and entitled "Method for Submitting Job Candidates."

This application also claims the benefit of U.S. Provisional Application No. 60/971,102 filed 10 Sep. 2007 and entitled "Method to Facilitate Engagement and Communication between a Company and a Recruiter: Status Updates", the benefit of U.S. Provisional Application No. 60/971,106 filed 10 Sep. 2007 and entitled "Method to Facilitate Engagement and Communication between a Company and a Recruiter: Hiring Deadline", the benefit of U.S. Provisional Application No. 60/971,109 filed 10 Sep. 2007 and entitled "Method to Facilitate Engagement and Communication between a Company and a Recruiter: Propose Bounty", the benefit of U.S. Provisional Application No. 60/971,112 filed 10 Sep. 2007 and entitled "Method to Facilitate Engagement and Communication between a Company and a Recruiter: Standing Bounty", the benefit of U.S. Provisional Application No. 60/971,126 filed 10 Sep. 2007 and entitled "Method to Facilitate Engagement and Communication between a Company and a Recruiter: Messaging", the benefit of U.S. Provisional Application No. 60/971,128 filed 10 Sep. 2007 and entitled "Method to Facilitate Engagement and Communication between a Company and a Recruiter: Pending Engagements", the benefit of U.S. Provisional Application No. 60/971,131 filed 10 Sep. 2007 and entitled "Method to Facilitate Engagement and Communication between a Company and a Recruiter: Feedback", and the benefit of U.S. Provisional Application No. 60/977,563 filed 4 Oct. 2007 and entitled "Method to Facilitate Engagement and Communication between a Company and a Recruiter: Sorting by Login." All twelve patent documents (one international patent application and the eleven US Provisional Applications) are incorporated in their entirety by this reference.

TECHNICAL FIELD

This invention relates generally to the e-commerce field, and more specifically to an improved method to facilitate engagement and communication between a company with an available position and a recruiter in the e-commerce field.

BACKGROUND

With the increasing mobility and sophistication of the modern labor force, companies often need to quickly fill an available position. Because of the depth and breadth of the expertise of most companies, it is impractical for them to engage candidates directly through a centralized human resources department. As such, many companies utilize one or more recruiters for the purpose of finding appropriate candidates for the required positions.

An unfortunate result of the use of recruiters is that companies are often inundated with information about candidates that are not qualified for one reason or another. Moreover, companies are often forced to deal with inexperienced or otherwise undesirable recruiters that do not have the appropriate skills for attracting the necessary talent. As a result, the combination of unqualified candidates and inefficient or inexperienced candidates forces companies to invest substantial time and resources in the evaluation and eventual rejection of prospective candidates. Ironically, the proliferation of inexperienced recruiters submitting the information of unqualified candidates places such a significant burden on the companies that for all practical purposes, they might be just as well served to perform their recruiting through their own firm. Thus, there is a need in the e-commerce field to create an improved, new and useful method to facilitate engagement and communication between a company with an available position and a recruiter.

SUMMARY

Accordingly, the present invention includes an improved, new and useful method to facilitate engagement and communication between a company with an available position and a recruiter. The method includes the steps of posting information about the available position for the company, and receiving information about a candidate for the available position of the company from the recruiter and submitting the information about the candidate for the available position of the company to the company. The method further includes the step of receiving payment from the company and transmitting a portion of the payment to the recruiter upon the selection by the company of a candidate for the available position.

BRIEF DESCRIPTION OF THE FIGURES

FIGS. 4-14 are screen shots depicting a user interface and a networked computer in accordance with alternative embodiments of the present invention.

DETAILED DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
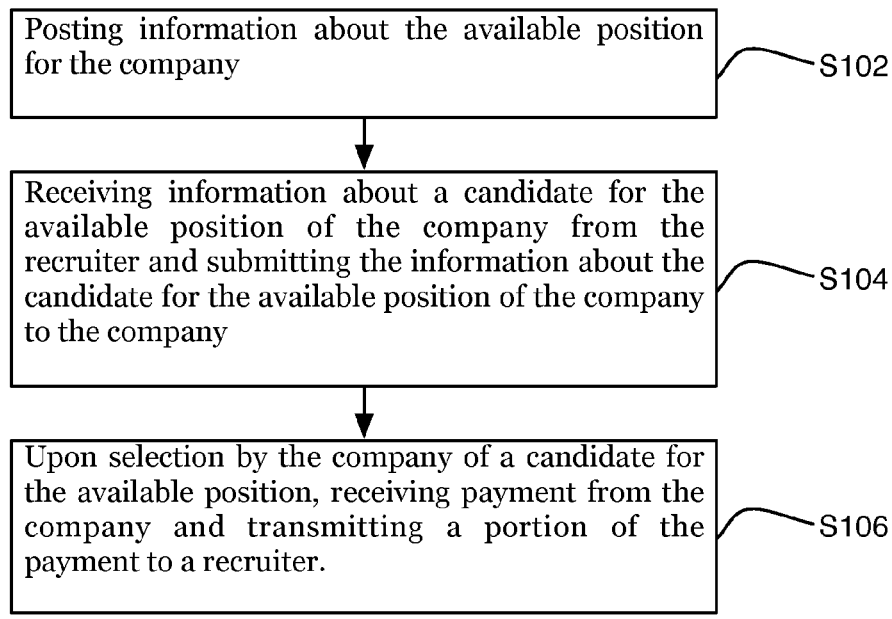
FIG. 1 is a flowchart illustrating the steps of a method of a preferred embodiment of the invention.

As shown in FIG. 1, the method of the preferred embodiment includes a series of steps to facilitate engagement and communication between a company with an available position and a recruiter. As used herein, the term "company" refers to an entity or natural person that is engaged in a business. The term "available position" refers to any opportunity for a relationship between the company and any natural person or entity (a "candidate"). The term "relationship" includes, for example, an employment agreement, a service agreement, or any other contractual arrangement involving payment by the company to the candidate for due consideration according to the relationship. The term "recruiter" refers to any natural person or entity that engages, on a limited or exclusive basis, in the business of facilitating the entry of a candidate and a company into a relationship. The term "bounty" is a payment or reward, preferably in the form of a monetary transaction, from the company to the recruiter for the acceptance of a submitted candidate.

Step S102 of the method of the preferred embodiment recites posting information about the available position for the company. The information about the available position can include any pertinent or requisite skills preferred or required for the available position as well as any background information about the company or the available position. Additionally, the information about the available position can include for example any necessary submissions by the candidate including any pertinent biographical or working history, including for example a resume, curriculum vitae, writing sample, salary requirements, salary history, employment history, employer references, background check information, professional or paraprofessional licenses, credit history, citizenship status, employment visa status, security clearances, and/or any additional information required for the available position. Step S102 may include sending an attachment relating to a candidate submission from the recruiter to an employer. This attachment may be a writing sample, a coding sample, a transcript, or any other suitable attachment related to a candidate submission.

Step S104 of the method of the preferred embodiment recites receiving information about a candidate for the available position of the company from the recruiter and submitting the information about the candidate for the available position to the company. The information about the candidate can include any pertinent biographical or working history, including for example a resume, curriculum vitae, writing sample, salary requirements, salary history, employment history, employer references, background check information, professional or paraprofessional licenses, credit history, citizenship status, employment visa status, security clearances, and/or any additional information required for the available position.

Step S106 of the method of the preferred embodiment recites receiving payment from the company and transmitting a portion of the payment to the recruiter upon selection by the company of a candidate for the available position.

Figure 2:
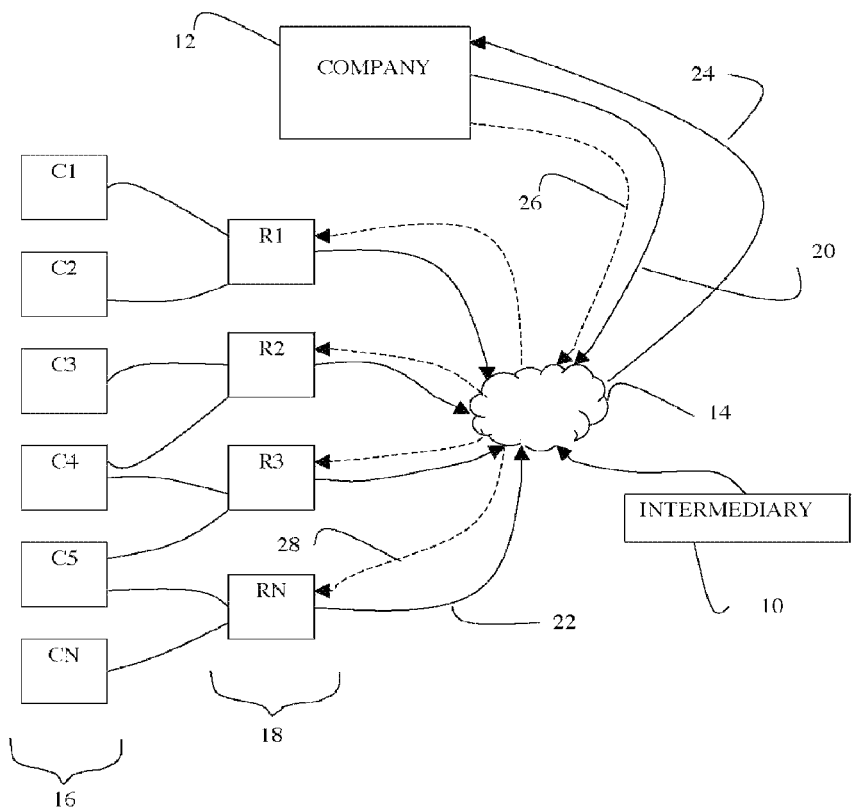
FIGS. 2-3 is a schematic diagram illustrating the parties involved in the method of the preferred embodiment.
Figure 3:
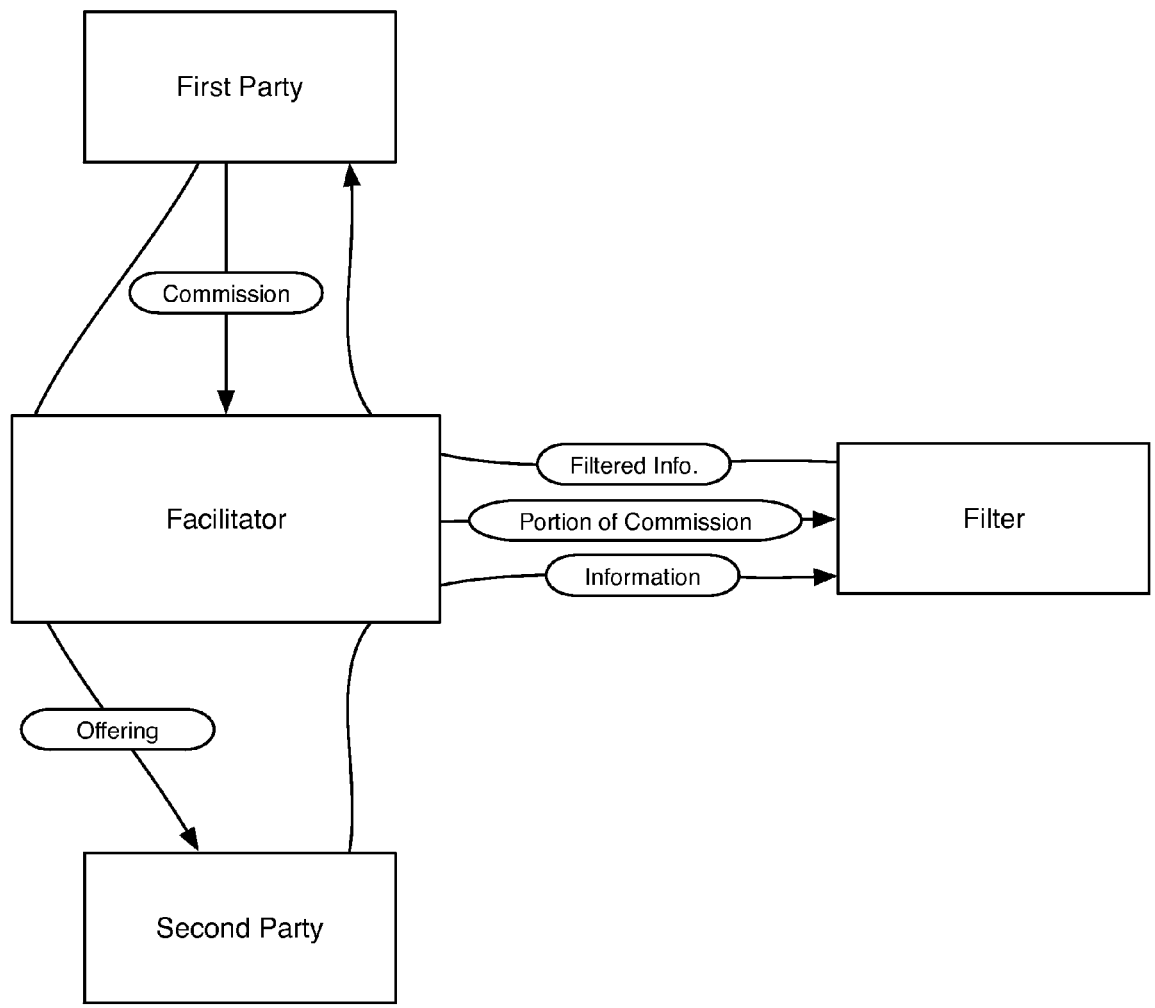
Figures 4, 5:
Figure 8:
Figure 9:

In a first variation of the preferred embodiment, steps S102 and S104 are performable over a computer network. As shown in FIGS. 2 and 3, an intermediary 10, a company 12, a plurality of recruiters (R1, R2, R3, and RN) 18 and a plurality of candidates (C1, C2, C3, C4, C5 and CN) are operatively connectable, either through wired or wireless means, to a computer network 14. The computer network 14 functions to permit data communications between two or more parties, such as the company 12 and one or more of the plurality of recruiters 18, such that the company 12 and the one or more of the plurality of recruiters 18 need not be in direct, personal contact regarding the available position or any attribute thereof. Moreover, the computer network 14 functions to allow the company 12 to readily post information 20 about the available position to the plurality of recruiters 18 in a simultaneous, interactive, and widely disseminated manner. The computer network 14 further functions to permit the recruiters to submit information about a candidate 22 to the company 12, and for the company 12 to access one or more submissions 24. Lastly, the computer network 14 functions to facilitate the receipt of payment 26 from the company 12 and the transmitting of a portion of the payment 28 to a recruiter 18. The computer network 14 can include any two or more computers that are connectable directly or indirectly through a local or wide-network, including for example the Internet or World Wide Web. Each of the company and the plurality of recruiters can communicate through the computer network 14, for instance through a single website consisting of multiple web pages operated by an intermediary 10. In the first variation of the method of the preferred embodiment, step S102 can include for example posting information about the available position on or through any computer that is connected to or connectable to the computer network 14, such as for example a server, personal computer, personal digital assistant, mobile phone or any other combination of hardware and/or software that is adapted to perform machine executable instructions according to the method of the preferred embodiment. Similarly, step S104 can include receiving information about a candidate for the available position of the company from the recruiter and submitting the information about the candidate for the available position to the company on or through any computer that is connected or connectable to the network 14 as described above.

In a second variation of the method of the preferred embodiment, Step S102 includes posting information about the available position for the company and a number of submissions for the available position. The step of posting the number of submissions for the available position functions to inform the company and one or more recruiters as to the probability of a successful selection by the company of a candidate through the laws of supply and demand. As such, the step of posting the number of submissions for the available position further functions to inform the company and one or more recruiters as to the competitiveness of: (1) the company's position with regard to potential candidates, and (2) the one or more recruiters relative prospects of having one of its candidates selected by the company. If the number of submissions is large at a point in time, the company's competitive position is relatively increased while that of each individual recruiter is decreased. Conversely, if the number of submissions is small at a point in time, the company's competitive position is relatively decreased while that of each individual recruiter is increased. In one version of the second variation of the method of the preferred embodiment, S104 may be adapted to include displaying the current stage of the candidate hiring process. The company may post an update on the current stage of the hiring process, such as "contacting candidate", "interviewing via telephone", "interviewing in person", "skills testing", "reference checking", "vacations", "remove from public marketplace", "negotiating", "accepted", "candidate declined offer", "candidate not selected", or any other suitable hiring process stage. This allows the recruiter to judge the likelihood of receiving the bounty for the candidate. It also allows employers to make a bounty private to only those recruiters that they want to invite. In another variation, recruiters may agree to accept a reduced bounty or pay a small fee to view the update on the current stage of the candidate hiring process. In yet another version, companies may pay a fee to avoid providing updates on the current stage of the hiring process. Similarly, S106 may also be adapted to include status updates on the payment of the bounty, particularly if there are any special conditions that may be applied before a bounty is paid, such as an applicant passing a drug test.

In a third variation of the method of the preferred embodiment, step S102 includes posting a bounty for the available position of the company. The step of posting a bounty for the available position of the company functions to increase the incentives for any one or more recruiters to submit the information about a candidate to the company. The step of posting a bounty for the available position of the company can be performed by the company or any agent of the company. The posting of the bounty is performable over a computer network 14 of the type described above with reference to FIGS. 2 and 3. Alternatively, the posting of the bounty is performable through any other means or mechanisms not involving a computer network of the type described above. The bounty can include for example a pecuniary award payable in exchange for a successful selection of a candidate for the available position. The bounty can be payable through any means, including cash, check, credit card payment, wire transfer and the like, and can be payable in any currency or denominations thereof.

In one alternative to the third variation of the method of the preferred embodiment includes allowing the company to modify the amount of the bounty. Allowing the company to modify the bounty functions to permit the company to attract more or fewer potential recruiters, and thus more or fewer potential candidates for the available position. As expected according to general economic principles, if the company decreases the amount of the bounty, then fewer recruiters and thus fewer potential candidates will likely be interested in the available position. On the contrary, if the company increases the amount of the bounty, then more recruiters thus more potential candidates will likely be interested in the available position. Alternatively, the method can include the step of allowing the company to modify the amount of the bounty such that the company is allowed to increase, but not decrease, the amount of the bounty. This alternative functions to assure the recruiter at least a minimum value of a bounty, such that the recruiter is willing to invest the necessary time and energy in order to submit a candidate for the available position.

In other alternatives to the third variation of the method of the preferred embodiment, the bounty is related to step S106 shown in FIG. 1. In one alternative, step S106 includes receiving payment from the company in an amount more than the bounty and transmitting an amount equal to the bounty to the recruiter. Alternatively, step S106 can include receiving payment from the company in an amount equal to the bounty and transmitting an amount less than the bounty to the recruiter. As noted above, step S106 can be performed by any party including any natural person or entity, as well as any of the parties described herein including the intermediary 10, shown in FIGS. 2 and 3. According to the variations described above therefore, the performer of the method can receive remuneration for its services depending upon the relationship between the bounty and the amounts payable/receivable from the recruiter/company, respectively.

In yet other alternative to the third variation of the method of the preferred embodiment, the bounty is related to steps S102 and S104 shown in FIG. 1. To avoid massive amounts of information overload, the postings can be restricted and/or the submissions may be restricted to certain recruiters based on the size of the bounty and based on the qualifications of the recruiter. For example, available positions with smaller bounties may be viewed by a larger portion (or all) of the recruiters, while available positions with larger bounties may be viewed by a smaller portion of the recruiters. In other words, the higher the bounty, the more restrictive (in terms of viewing an available position and/or a submitting information about a candidate). The restrictions may be based on one of the following measurements: number of submissions, number of selections of the candidates submitted to the recruiter, ratio of number of submissions to number of selections of the candidates submitted by the recruiter, an amount paid to the recruiter, candidate submission interview rate, recently filled positions, submission opened rate (the % of submissions by a recruiter that are opened), submission processed rate (the % of submissions not rejected or acted on within a time period (e.g. two weeks)) or any combination thereof. Alternatively, the restriction can be based on, for each recruiter, the number of designations as a blocked recruiter or a number of designations as a preferred recruiter, or any ratio or combination there of. Alternatively, the limited number can be based on various qualitative judgments or rankings from companies for which the recruiter has performed in the past, or any combination of quantitative and qualitative factors or judgments indicative of the limited number of active listings to which the recruiter should be entitled.

In another version of the third variation of the method of the preferred embodiment, S102, S104 and S106 may be adapted to include hiring a best candidate by a deadline. In step S104, candidates are preferably submitted by recruiters before a deadline presented with the job listing. The company preferably evaluates the job candidate as being a good match for the position right before the hiring decision is made, i.e. at the deadline. However, the company may evaluate the currently submitted candidates at any time before the deadline and rank the candidates in order, or simply select the best candidate, display the rankings, and/or notify the other recruiters to keep looking for a better candidate. In one version, recruiters may agree to accept a reduced bounty, or pay a fee to view the ranking of their candidate and/or all other candidates for the position. Companies may end the candidate submission time early if an acceptable candidate is found, and this may cost a fee. Step S106 may include holding the bounty in escrow by a third party. Further, a company may specify that one recruiter from the pool of recruiters that submit candidate information will earn a bounty, or otherwise signify that the company is not recruiting for that position from other sources than the pool of recruiters that submit candidate information.

In another alternative to the third variation of the method of the preferred embodiment, S102, S104 and S106 may be adapted to include the creation and payment of a standing bounty for candidates. Step S102 may include allowing the company to place a standing order for at least one skill or type of candidate that the company is always looking for (such as software engineers at Google). Step S104 may include allowing a company to accept any number of candidate submissions from recruiters for an indefinite time (or until later modified). Since the bounty is a standing bounty, the recruiter may submit any number of candidates, the number of candidate submissions per recruiter may be limited, or a specified number of un-hired candidate submissions may limit or reduce the frequency of submissions by the recruiter. The company may accept any number of candidate submissions from recruiters for an indefinite time. Step S106 may include the recruiter receiving payments for each recruiter submitted candidate hired. These payments may be fixed amounts or fixed percentages of the company payment to a third party, or the amount of the payment may be variable, i.e. the payment from the company increases or decreases for each additional hired candidate submitted by a recruiter. Additionally, the standing order may appear as only a single job listing which may be re-listed either manually from a pool of positions (to clone) or automatically via a specification of the company.

In an additional version of the third variation of the method of the preferred embodiment, a recruiter submitting multiple candidates for a standing bounty or multiple candidates for different positions at a company may earn a modified bounty, preferably a greater bounty. This modified bounty may be a higher fee for each additional candidate, or the modified bounty may be calculated synergistically (an extra 3% on all bounties for each additional candidate).

In a fourth variation of the method of the preferred embodiment, step S104 further includes the step of checking a database of previously submitted information about a candidate for the available position of the company and if information about the candidate for the available position of the company has not been previously submitted, then submitting the information about the candidate for the available position of the company to the company, otherwise informing the recruiter that the information about the candidate for the available position of the company has been previously submitted. The fourth variation of the method of the preferred embodiment functions to prohibit the company from receiving information about any one candidate from multiple recruiters, which would hinder the efficiency and selection process of the company. The performer of this variation of step S104 therefore provides a clearinghouse service to the company by prohibiting multiple submissions of redundant information, which accelerates the efficiency and selection process of the company. The process of checking a database may include, for example, checking for a particular identification of the candidate. The identification may include, for example, the full name, the Social Security Number, the Driver's License Number, the home address, the email address, the phone number (home, work, or mobile), or any other appropriate identification of the candidate. The process of checking a database may alternatively include checking a hash function (a small digital "fingerprint") of a portion of the submission, such as the resume of the candidate.

In a fifth variation of the method of the preferred embodiment, the method includes the step of allowing the company to designate a recruiter as a preferred recruiter for the company. The step of allowing the company to designate a recruiter as a preferred recruiter functions to further streamline the selection process and to provide the company more control in its dealings with the plurality of recruiters. This step can be performed by any party designed above, including for example an intermediary as shown in FIGS. 2 and 3. Moreover, allowing the company to designate one or more preferred recruiters may lead to cost savings in the selection process, as one or more preferred recruiters may be preferred for their relatively low costs, high rate of performance, or both. In one variation, the preferred recruiter is highlighted or marked with a color or symbol such as a "P" or a star.

In an alternative to the fifth variation, the method of the preferred embodiment further includes the steps of receiving contact information for the company, and upon designation of the recruiter as a preferred recruiter for the company, allowing the preferred recruiter to access the contact information of the company. The performer of this step functions as another type of clearinghouse for the company to the extent that, at the company's discretion, it can authorize only a designated preferred recruiter to access its contact information. Those recruiters that are not designated as preferred recruiters will not have access to the company's contact information, and therefore will be less likely to submit candidate information to the company. Accordingly, the performer of this step aids in the streamlining and efficiency of the selection process by protecting the company from receiving unsolicited, non-preferred or otherwise undesirable submissions from a non-designated recruiter.

In a sixth variation of the method of the preferred embodiment, the method further includes the step of allowing the company to designate a recruiter as a blocked recruiter for the company. In this step, the performer of the step functions to further protect the efficiency and timeliness of the submission process by limiting, at the designation of the company, the number and quality of recruiters that are submitting candidate information for any particular position for the company. This could be employed, for example, when a company determines that a particular recruiter has ignored the requirements for a particular available position, has submitted poor candidates, or has otherwise disappointed the company.

In an alternative to the sixth variation, the method further includes the steps of: upon receiving information about a candidate for the available position of the company from the recruiter, checking a database of blocked recruiters for the company and if the recruiter is not a blocked recruiter for the company, then submitting the information about the candidate for the available position of the company to the company. If the recruiter is a blocked recruiter, then the alternative step includes informing the recruiter that the information about the candidate for the available position of the company has not been submitted. Functionally, the performer of these alternative steps further functions as a clearinghouse for the company, with the added benefits of automatically informing the recruiter that its services are not available to the company.

In a seventh variation of the method of the preferred embodiment, the method further includes the step of allowing the recruiter to list as an active (or "engaged") recruiter for the available position. This step functions to allow a recruiter to signal increased interest in the company and the available position for the company, which in turn further functions to allow a recruiter to distinguish himself amongst other recruiters that may be passively interested in the submission for the available position. The step of listing as an active recruiter can be performed on or through a computer network such as that described above, thereby communicating the recruiter's listing to the company with the available position. The method may also include the step of allowing the recruiter to de-list a recruiter as an active recruiter for an available position. This step functions to permit a company to regulate the number and/or quality of recruiters that can submit themselves as an active recruiter for a particular available position. The de-listing can be performed through a computer network, such as through an Internet-based software operable through two or more networked computers. The de-listing can be in response to a past performance of a recruiter, a performance history of the recruiter, to decrease the number of active recruiters for the available position, or any other reason.

An alternative to the seventh variation includes a variation of step S102 that includes posting information about the available position for the company and the number of active recruiters for the available position. This step functions to permit a company see the number and identity of those active recruiters that are showing an increased level of interest in submitting candidate information for the available position. This step further functions to allow one or more recruiters to see the aggregate interest in, and hence the prospective competition for, a submission with respect to the available position. To the extent that there are a large number of active recruiters, the company can expect a proportionally large number of submissions of information about candidates. Conversely, if there are a small number of active recruiters, then the company may opt to modify the amount of the bounty as described above in order to attract more interest from those recruiters that are not currently listed as active recruiters.

In a further alternative to the seventh variation, the step S102 can include posting information about the placement history for the active recruiters for an available position. As in other steps noted above, performance of this step functions to distinguish one or more active recruiters from each other, thereby allowing the company to more competitively select a proper recruiter and/or block any undesirable recruiters. Moreover, posting of the placement history functions to inform other recruiters about the success rate of their respective competition, thereby increasing each party's incentive to perform well in the submission step. In one version, the placement history includes one of the following measurements: number of submissions, number of selections of the candidates submitted to the recruiter, ratio of number of submissions to number of selections of the candidates submitted by the recruiter, an amount paid to the recruiter or any combination thereof. In another version, the placement history can include various qualitative judgments or rankings from companies for which the recruiter has performed in the past, or any combination of quantitative and qualitative factors or judgments indicative of the placement history of the recruiter. In yet another version, the placement history can include specific information about the successful placements of the recruiter in the past, such as information about the available position, the company, the elapsed time from the original posting to the submission of the first candidate or to the submission of the eventually selected candidate, the elapsed time from the posting to the selection of a candidate.

In another further alternative of the seventh variation of the method of the preferred embodiment, a list of active (or "pending") engagements of a particular recruiter may be viewed by a recruiter evaluating a company, a company evaluating a recruiter, and/or a job candidate evaluating a recruiter and/or a company. The list of pending engagements may be filtered based on parameters such as number of jobs recruiting for, competitors, number of successful placements, number of jobs available, average response time, priority, or any other recruiting method. One of the purposes of the list is to provide some indicator of the responsiveness of the other party. For example a recruiter may review a list of the pending engagements of a company and determine the responsiveness/likelihood of getting a bounty is lower-than-desired if the company has a large number of jobs posted, a large number of preferred recruiters, or a large number of candidates pending for a particular job. However, a company may also evaluate how many other companies a recruiter was currently working for and use this information to decide whether or not to use the recruiter. For example, if a recruiter were a preferred recruiter for a number of well-known companies, then a company may view that recruiter as more successful and also engage them, even though they have a large number of pending engagements. An additional purpose of the list of pending engagements may be to allow companies to determine if a recruiter may have conflicts of interest, or be working with competitors.

In another alternative to the seventh variation of the method of the preferred variation, the method further includes the steps of upon receiving information about a candidate for the available position of the company from the recruiter, checking a database of active recruiters for the company and if the recruiter is not an active recruiter for the company, then receiving payment from the recruiter and submitting the information about the candidate for the available position of the company to the company. The monetary transaction functions as a disincentive for the non-active recruiter to submit candidates without properly considering the job position and the needs of the company. If faced with a charge to submit a candidate for a position, the non-active recruiter will likely limit or filter their submissions. Thus, the performer of this step aids in the streamlining and efficiency of the selection process by discouraging the submission of unsolicited, non-preferred or otherwise undesirable submissions from a non-active recruiter. The monetary transaction may be proportional, or otherwise related, to the size of the bounty of the available position.

In another alternative to the seventh variation of the method of the preferred variation, the method further includes the steps of upon receiving information about a candidate for the available position of the company from the recruiter, checking a database of active recruiters for the company and if the recruiter is not an active recruiter for the company, then informing the recruiter that the information about the candidate for the available position of the company has not been submitted. Functionally, the performer of these alternative steps further functions as a clearinghouse for the company, with the added benefits of automatically informing the recruiter that its services are not available to the company.

In another variation of the seventh variation of the method of the preferred embodiment, the method includes the step of allowing the recruiter to list as an active recruiter for a limited number of available positions. This step functions to increase the efficiency of the submission process by preventing recruiters from listing as active recruiters for an unsuitable number of available positions. To the extent that each recruiter is so limited, then each recruiter will have additional incentive, time and energy to most effectively submit information for more worthy candidates for the limited number of available positions. The limited number can be universally applied to every recruiter, or it can be individualized for each recruiter, or it can be determined according to a formula or combination of factors. For example, the limited number can be based on one of the following measurements: number of submissions, number of selections of the candidates submitted to the recruiter, ratio of number of submissions to number of selections of the candidates submitted by the recruiter, an amount paid to the recruiter or any combination thereof. Alternatively, the limited number can be based on, for each recruiter, the number of designations as a blocked recruiter or a number of designations as a preferred recruiter, or any ratio or combination thereof. Alternatively, the limited number can be based on various qualitative judgments or rankings from companies for which the recruiter has performed in the past, or any combination of quantitative and qualitative factors or judgments indicative of the limited number of active listings to which the recruiter should be entitled.

In an eighth variation of the method of the preferred embodiment, the method further includes the step of facilitating the mutual acceptance by both the company and the recruiter of the recruiter as an active recruiter for an available position of the company. The step of facilitating functions to streamline and accelerate the submission process by appropriately matching the company with a suitable recruiter for the active recruiter designation. The facilitation step can include for example, the aforementioned steps of establishing preferred, blocked, active, or de-listed recruiters as well as posting a performance history for each recruiter. Alternatively, the facilitation step can include providing a contract, agreement, discount, bonus or other incentive to designate the recruiter as an active recruiter. Alternatively, the facilitation step can include allowing the company to invite a recruiter from their list of preferred recruiters. As such, the facilitation step can further include the step of providing contact information for a recruiter, and providing contact information for any recruiter designated as a preferred recruiter to the company that designated the recruiter as such. The step may also include entering a contract with a recruiter (a contracted recruiter is preferably considered a preferred recruiter and preferably has substantially the same rights as a preferred recruiter, but a preferred recruiter is not necessarily a contracted recruiter). The contract may also dictate a modified bounty for a recruiter entering a contract with a company, which may ultimately be reflected as a discount to the company.

In an alternative version of the eighth variation of the method of the preferred embodiment, the method includes the step of facilitating the mutual acceptance by both the company and the recruiter of the recruiter as an exclusive recruiter for an available position of a company. This step can include for example, causing the company to de-list substantially all active recruiters for an available position, such that a remaining recruiter becomes an exclusive recruiter for the available position. Alternatively, the step can include providing an agreement to be executed by the company and the recruiter, wherein the agreement specifies that only information about a candidate received from the exclusive recruiter can be submitted to the company. Alternatively, the agreement can authorize the third party or intermediary to block the submissions of all other recruiters to the company, the posting by the company of information regarding the available position to any other recruiters, or any combination thereof.

In another version of the eighth variation of the method of the preferred embodiment, a company may post private bounties available only to selected recruiters, such as an exclusive recruiter that the company would like to work with, a group of recruiters that the company would like to work with, or any other suitable metric. In any listing of the company jobs, the bounty listing would be displayed as a private position, unless the viewer was with the company or among the selected recruiters. The position is preferably not displayed to recruiters until they are accepted as an exclusive recruiter, a preferred recruiter, an engaged recruiter or any other suitable recruiter designation that the company has specified for viewing the private position listing.

In a ninth variation of the method of the preferred embodiment, S102, S104 and S106 may be adapted to include proposing a new bounty for a job candidate. Step S102 may include modifications to the bounty agreement, where both the recruiters and the company agree on the bounty in advance, if candidates are determined to be better suited for another job within the company. The other job in the company is preferably a job already posted, but may alternatively be a newly created job for a candidate, or a job not yet listed. In order to prevent the company from taking advantage of the recruiter, and proposing low bounties on candidates they will hire for other positions than the position the candidate was submitted for, it is preferable to have an initial bounty modification agreement in place. The recruiter, the company, or an independent third party preferably specifies the bounty modification agreement in advance. The bounty modification agreement preferably includes a percentage of the original bounty, for example 125% or 80% of the bounty of the original position, and is agreed upon by all parties before the candidate is submitted. The company, when evaluating a candidate submitted by a recruiter for a position in S104, may determine that the candidate is acceptable and hire the candidate. However, in Step S104, the company may also determine that the candidate is a good candidate for another position within the company that may not have been posted, or may be created for the candidate. In this case, the company may propose a new bounty to the recruiter that submitted the candidate if no pre-agreed bounty modification terms have been agreed upon then Step S104 might also include modifying the bounty agreement. Step S104 may also include proposing a new job in the company, and accepting the candidate as an applicant for that position at a pre-determined bounty for proposing new jobs. The bounty determined in step S102 may be paid in S106 according to the terms agreed upon between the company, the recruiter and any third parties involved in the recruitment process.

In a tenth variation of the method of the preferred embodiment, the method includes the step of sending or displaying a message for all recruiters or all preferred recruiters. This message may contain information about a particular job opening that is high priority. Preferably the message is sent over a communications medium, such as email, instant message, voice messaging, SMS, bulletin board posting, blog, or any other suitable communication messaging medium.

In an eleventh variation of the method of the preferred embodiment, the method includes the step of soliciting feedback on recruiter performance. The feedback is preferably collected from at least one of the company and the job candidate. The feedback preferably inquires about the candidate quality, candidate matching success, courtesy, efficiency, professional demeanor, and/or any other important metrics of the recruiter's performance for the company. The feedback solicitation is preferably performed with a drop down selection box on a web page, but may alternatively be a comment box, a telephone survey, a mail survey, or any other method of soliciting recruiter feedback. The feedback is preferably displayed to recruiters so they may improve, but it is also preferably displayed to companies to enable a company to evaluate a particular recruiter. The feedback may also be displayed to the job candidate, to allow them to evaluate the recruiter. Messages sent to the recruiter are preferably pre-written, to provide standard informative feedback, while minimizing the risk of candidate lawsuits due to discrimination. A pre-written message may simply be a list of checkboxes (such as "not right skills", "not enough experience", "wrong location", "wrong visa status", etc.) or a pre-written message may be a drafted letter of intent, acceptance, rejection, or any other communication between companies and recruiters.

In a twelfth variation of the method of the preferred embodiment, the method includes the step of soliciting feedback on a bounty. The feedback is preferably collected from at least one of the recruiters or preferred recruiters. The feedback preferably inquires about the size of the bounty, the challenges of the job placement, and/or any other important metrics of the bounty. The feedback solicitation is preferably performed with a drop down selection box on a web page, but may alternatively be a comment box, a telephone survey, a mail survey, or any other method of soliciting feedback. The feedback is preferably displayed to company so they may improve or modify the bounties. The feedback may also be displayed to other recruiters, to allow them to evaluate the company and/or bounty.

In a thirteenth variation of the method of the preferred embodiment, the posted jobs may be sorted by a first sorting parameter such as industry, job title, job requirements, salary, bounty amount, region, or any other suitable sorting parameter. The posted jobs sorted by the first sorting parameter are preferably further sorted by a second sorting parameter. The second sorting parameter is preferably based upon the most recent company login time. One objective of this second sorting parameter is to allow recruiters and/or candidates to determine how active a company is on the site, and possibly alter their strategy regarding that company. Another objective of the second sort is to provide an incentive for companies to use the site more frequently, as it provides a more visible placement of any or all of their listing at the top of any sorted results of any of the first sorting parameters.

In a fourteenth variation of the preferred embodiment of the method, a company may add notes about recruiters that are shared among all or some of the members of that company. Further, a company may add notes about a candidate for members of hiring teams at a company to see. Recruiters may add notes for their recruiter team members, and/or recruiters may add notes about a candidate for a particular company to see. There may be a fee charged to leave such a note.

All of the foregoing steps, variations and alternatives thereof can be performed by one or more parties through a computer network of the type described above. The computer network can include for example a website including software adapted to perform each step, variations and alternatives thereof noted herein. Such a website can be operated by an intermediary. To that end, FIGS. 4-7 are illustrative of a schematic user interface through which a company may view, edit, manipulate, or otherwise interact with data and in turn interact with one or more recruiters. For example, the aforementioned FIGURES illustrate an example user interface whereby a company can view candidate information, recruiter information, active recruiters, performance histories, block recruiters, designate preferred recruiters, de-list active recruiters and designate an exclusive recruiter. FIGS. 8-14 are illustrative of a schematic user interface through which a recruiter may view, edit, manipulate, or otherwise interact with data and in turn interact with one or more companies. For example, the aforementioned FIGURES illustrate an example user interface for allowing a recruiter to view available positions for a company, designate itself an active recruiter, view company or information about a candidate, and submit information about a candidate to a company.

Although omitted for conciseness, the preferred embodiments include every logical combination and permutation of the above variations, alternatives, and versions of the preferred embodiment.

As a person skilled in the art will recognize from the previous detailed description and from the figures and claims, modifications and changes can be made to the preferred embodiments of the invention without departing from the scope of this invention defined in the following claims.

We claim:

1. A method comprising:
   on a first computer, a second computer, and a third computer interconnectable through a computer network:
      posting selectively-accessible information about an available position for the company on a first computer;
      posting a bounty for the available position on the first computer;
      receiving information about a candidate at the first computer from a second computer associated with the recruiter for the available position of the company from the recruiter;
      transmitting the information about the candidate for the available position of the company from the first computer to a third computer associated with the company;
      allowing the company to modify the amount of the bounty on the first computer from the second computer, wherein the amount of the bounty can be increased, but not decreased, by the company; and
   upon the selection by the company of a candidate for the available position, receiving payment from the company and transmitting a portion of the payment to the recruiter.

2. The method of claim 1, wherein receiving payment from the company and transmitting a portion of the payment to the recruiter occurs through the computer network.

3. The method of claim 1, wherein step receiving payment from the company comprises receiving payment from the company in an amount greater than the bounty and transmitting an amount equal to the bounty to the recruiter.

4. The method of claim 1, wherein step receiving payment from the company comprises receiving payment from the company in an amount equal to the bounty and transmitting an amount less than the bounty to the recruiter.

5. The method of claim 1, further comprising: in response to receiving information about a candidate for the available position of the company from the recruiter, receiving payment from the recruiter and submitting the information about the candidate for the available position of the company to the company.

6. The method of claim 5, wherein the size of the payment is a function of the size of the bounty.

7. The method of claim 6, wherein the size of the payment is proportional to the size of the bounty.

8. The method of claim 1, wherein posting selectively accessible information about the available position comprises restricting access to the information based on the size of the bounty.

9. The method of claim 8, wherein posting selectively accessible information about the available position comprises restricting access to the information based on the size of the bounty and the placement history for the active recruiters for an available position.

10. The method of claim 8, wherein posting selectively accessible information about the available position comprises restricting access to the information based on the size of the bounty and one of the following measurements: a number of submissions, a number of selections of the candidates submitted by the recruiter, a ratio of number of submissions to number of selections of the candidates submitted by the recruiter, a candidate interview rate, a number of recently filled positions, a submission opened rate, a submission processed rate, or an amount paid to the recruiter.

11. The method of claim 1, wherein receiving information about a candidate comprises restricting receipt of the information about the candidate from the recruiter based on the size of the bounty.

12. The method of claim 11, wherein receiving information about a candidate comprises restricting receipt of the information about the candidate from the recruiter based on the size of the bounty and the placement history for the active recruiters for an available position.

13. The method of claim 11, wherein receiving information about a candidate comprises restricting receipt of the information about the candidate from the recruiter based on the size of the bounty and one of: a number of submissions, a number of selections of the candidates submitted by the recruiter, a ratio of number of submissions to number of selections of the candidates submitted by the recruiter, a candidate interview rate, a number of recently filled positions, a submission opened rate, a submission processed rate, or an amount paid to the recruiter.

14. The method of claim 1, wherein transmitting the information about the candidate comprises restricting transmissions to the company based on the size of the bounty.

15. The method of claim 14, wherein transmitting the information about the candidate comprises restricting transmissions to the company based on the size of the bounty and the placement history for the active recruiters for an available position.

16. The method of claim 14, wherein transmitting the information about the candidate comprises restricting transmissions to the company based on the size of the bounty and one of the following measurements: a number of submissions, a number of selections of the candidates submitted by the recruiter, a ratio of number of submissions to number of selections of the candidates submitted by the recruiter, a candidate interview rate, a number of recently filled positions, a submission opened rate, a submission processed rate, or an amount paid to the recruiter.

17. The method of claim 1, further comprising displaying the current stage of the candidate hiring process within the company on the second computer associated with the recruiter.

18. The method of claim 17, wherein the current stage of the candidate hiring process within the company is one selected from the group consisting of: contacting candidate, interviewing via telephone, interviewing in person, skills testing, reference checking, vacations, remove from public marketplace, negotiating, accepted, candidate declined offer, candidate not selected, and failed drug test.

19. The method of claim 17, wherein the current stage of the candidate hiring process within the company is displayed for the recruiter in response to receiving payment from the recruiter.

20. The method of claim 17, wherein the current stage of the candidate hiring process at the company is displayed for the recruiter in response to the recruiter being selected from the group consisting of: an active recruiter, an engaged recruiter, a preferred recruiter, a contracted recruiter, and an exclusive recruiter.

21. The method of claim 1, further comprising proposing a new bounty for a submitted candidate.

22. The method of claim 21, further comprising reallocating the submitted candidate for another posted position of a company.

23. The method of claim 21, further comprising reallocating the submitted candidate for a new position of a company.

24. The method of claim 1, further comprising selecting a candidate by a deadline.

25. The method of claim 24, further comprising collecting a fee from the company to select a candidate for a position of the company before the deadline.

26. The method of claim 24, further comprising receiving from a company a ranked list of submitted candidates at a time prior to the deadline.

27. The method of claim 26, further comprising collecting a fee from a recruiter to view a ranked list of the candidates for a position of the company.

28. The method of claim 24, wherein posting selectively-accessible information about an available position comprises specifying that a recruiter who has submitted a candidate for a position of the company will win the bounty if their candidate for the position of the company is selected.

29. The method of claim 1, wherein the bounty is a standing bounty.

30. The method of claim 1, further comprising soliciting feedback from a recruiter on a posted bounty.

31. The method of claim 30, wherein the feedback on a posted bounty includes one selected from the group consisting of: a size of the bounty, the challenges of the job placement, and ease of working with the company.

* * * * *